Jan. 3, 1956 A. H. FAULKNER 2,729,705

TELEPHONE SYSTEM

Filed April 27, 1951 3 Sheets-Sheet 1

INVENTOR.
ALFRED H. FAULKNER

BY Chas. W. Candy

ATTORNEY

Jan. 3, 1956 A. H. FAULKNER 2,729,705

TELEPHONE SYSTEM

Filed April 27, 1951 3 Sheets-Sheet 2

*INVENTOR.*
ALFRED H. FAULKNER

*BY* [signature]

ATTORNEY

Jan. 3, 1956 A. H. FAULKNER 2,729,705

TELEPHONE SYSTEM

Filed April 27, 1951 3 Sheets-Sheet 3

INVENTOR.
ALFRED H. FAULKNER

BY

ATTORNEY

United States Patent Office 2,729,705

Patented Jan. 3, 1956

2,729,705

TELEPHONE SYSTEM

Alfred H. Faulkner, Chicago, Ill., assignor to Automatic Electric Laboratories, Inc., Chicago, Ill., a corporation of Delaware Application April 27, 1951, Serial No. 223,247

37 Claims. (Cl. 179—18)

This invention relates in general to telephone systems, and more particularly a system having a rectifier matrix for extending connections, and the circuits in cooperation therewith.

For establishing connections between line circuits and finder-connector switches, bank contacts are customarily used. The switching banks are costly and collect thereon foreign matter that tends to hinder satisfactory performance.

Accordingly, the present invention provides a telephone system in which the communicating circuits are established through a network of rectifiers or asymmetrical conductors in lieu of the customary banks. Switches will be employed in conjunction therewith, but by way of example, the rectifier matrix herein provided enables a pair of ten-point switches to perform the function of a hundred-point switch, thereby reducing the cost of the system.

An important object of the present invention is to provide a finder-connector switch having an asymmetrical conductor matrix therein for establishing connections.

Another object of the present invention is to provide a call allotter having a circuit therein for testing the condition of line circuits and operating a finder switch to step the finder switch to the calling line circuit.

Another object of the present invention is to provide a call allotter having means therein for stepping to the calling line circuit and stepping the finder switch successively therewith.

Another object of the present invention is to provide means whereby a call allotter selects in successive order calling lines, when several calls are initiated simultaneously.

Another object of the present invention is to provide a switch having rectifiers arranged in a co-ordinate array arrangement for establishing connections.

Another object of the present invention is to provide a finder-connector switch with a rectifier matrix, wherein means are provided for rendering only certain rectifiers conductive for extending connections.

Another object of the present invention is to provide a finder-connector switch having a rectifier matrix, wherein a pulsating current circuit is provided for rendering only certain rectifiers conductive for extending connections.

Other objects will be apparent upon further perusal of the detailed description taken in conjunction with the accompanying drawings.

Figure 1:
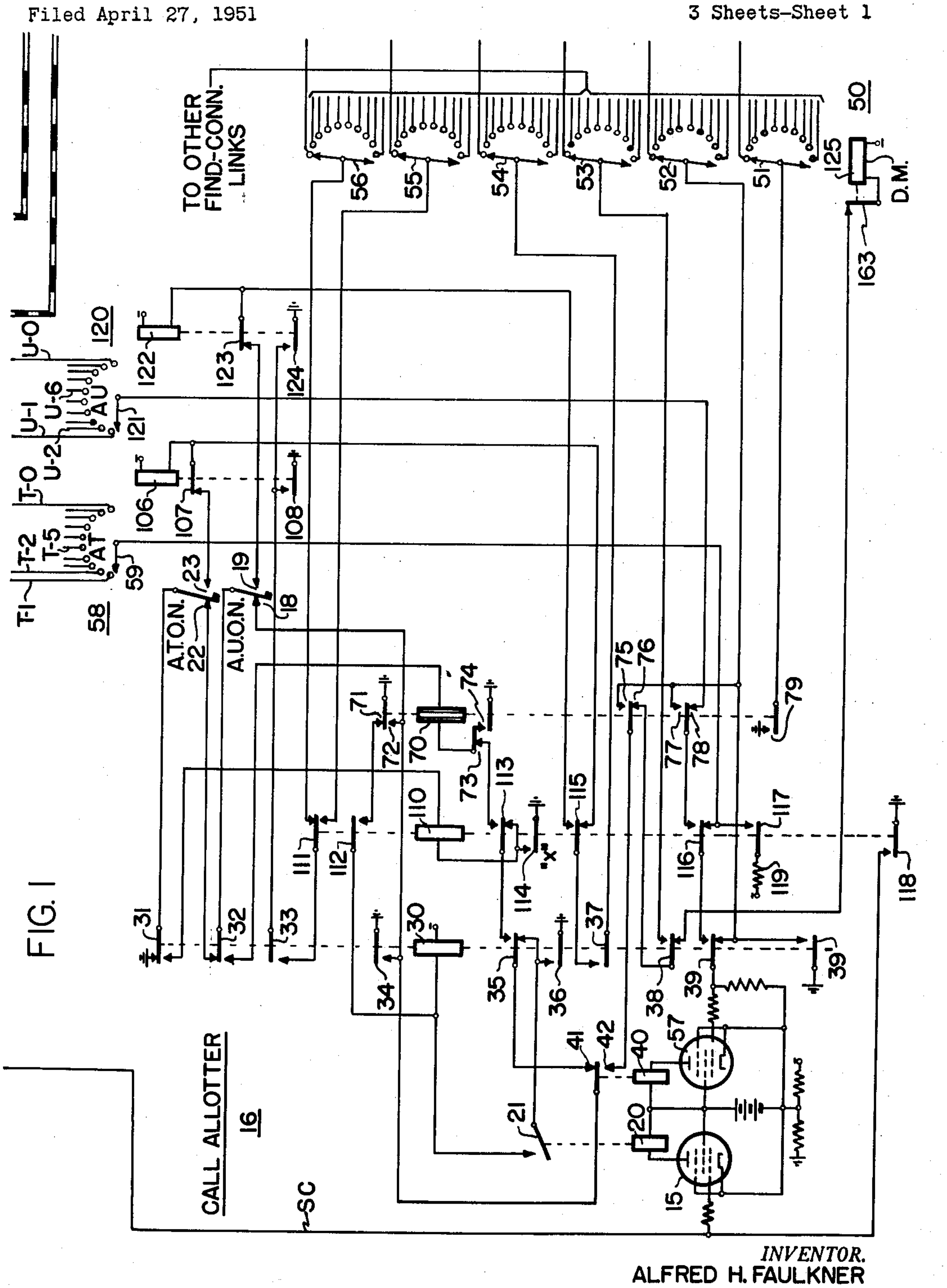
Figure 1 is a schematic diagram of a call allotter embodying the present invention.

In the preferred embodiment, the present invention provides a one-hundred line telephone exchange. For purposes of simplicity, only line circuit of line 11 is herein shown, which is a relayless line circuit having therein a conventional subscriber's substation 12.

When a call is initiated over line 11, the subscriber removes a handset at substation 12 to close the circuit through line resistors 148 and 13, thus causing the start lead S–11 to become negative because of the voltage drop across line resistor 13. The potential drop across the line resistor 13 reduces the positive potential on the line side of a rectifier 14, thereby rendering the line rectifier 14 conductive. The negative potential on the start lead S–11 is impressed on the control grid of electron tube 15 of a call allotter 16 through rectifier 14 and by way of common start lead SC, thereby seizing the call allotter 16 for operation.

The call allotter 16 is herein provided for pre-selecting a suitable switch, such as an idle finder-connector link 17, and also for controlling the stepping operation of the selected switch, such as the finder-connector link 17, in extending a connection from the calling line.

The negative potential impressed on the control grid of tube 15 via the common start lead SC renders the normally conducting electron tube 15 non-conductive by biasing the tube beyond cut-off. In response thereto, normally operated relay 20 restores, thereby closing contacts 21. The closing of contacts 21 completes an energizing circuit for relay 30 over the following path: battery, relay 30, contacts 21, armature 35, contacts 41, A. U. O. N. contacts 18, armature 32, A. T. O. N. contacts 22, armature 31 and ground.

Relay 30 operates, and armature 36 is so arranged that it closes to complete a locking circuit for relay 30 before armature 31 removes the ground from the energizing circuit of relay 30. Armature 39′ closes to place ground on a wiper 52 of a rotary distributor switch 50 of the call allotter 16. Armature 39 transfers the control grid of tube 57 from wiper 52 of the distributor switch 50 to a wiper 59 of tens switch 58 in the call allotter 16.

Figures 2, 4:
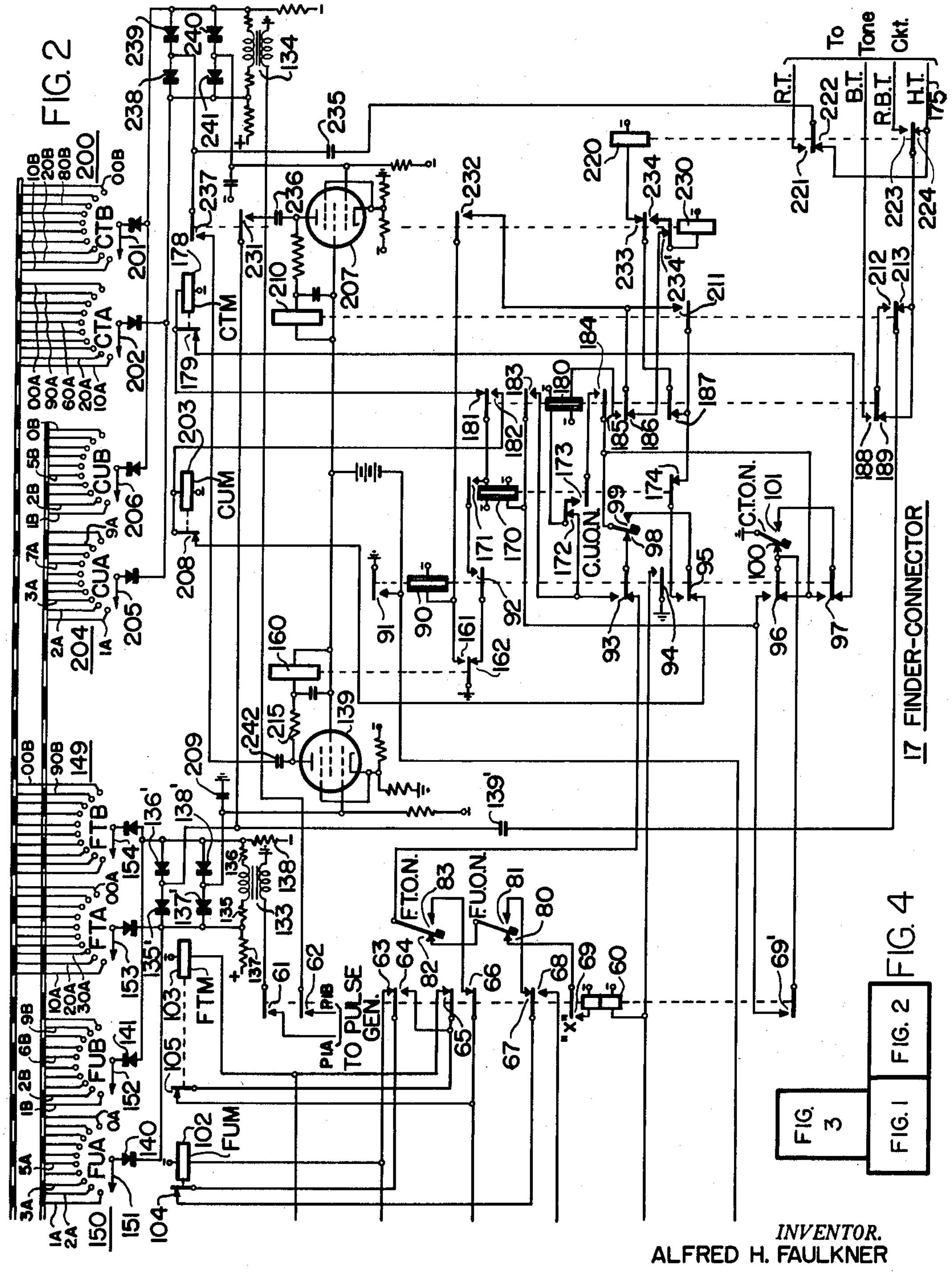
Figure 2 is a schematic diagram of the finder-connector switch embodying the present invention.
Figure 4 is a block diagram illustrating the arrangement of the respective figures embodying the present invention.

Wiper 52 is normally connected to negative battery through the lower winding of relay 60 of the finder-connector link 17, shown in Figure 2, assuming that the call allotter 16 has pre-selected idle link 17 in a manner hereinafter to be described, thereby rendering testing tube 57 non-conductive. When the control grid of tube 57 is transferred to wiper 59 of tens switch 58, tube 57 becomes conductive in the event that the wiper 59 is not connected to the calling line, since the grid to cathode voltage on tube 57 will be zero or a positive potential.

Tube 57, when conductive, energizes relay 40. Relay 40 operates, and contacts 42 close to complete a circuit to the wiper 53 of the rotary distributor switch 50 over the following path: ground, armature 34, contacts 42, contacts 76, armature 38, and wiper 53.

The lower winding of relay 60 is energized by the ground on wiper 52 of the rotary distributor switch 50 over the following path: battery, lower winding of relay 60, wiper 52, armature 39′ and ground. The lower winding of relay 60 on being energized, closes contacts 69 to complete an operating circuit for the upper winding thereof over the following path: battery, upper winding of relay 60, contacts 69, F. U. O. N. contacts 80, F. T. O. N. contacts 82, armature 93, C. U. O. N. contacts 98, armature 96, C. T. O. N. contacts 100 and ground.

Relay 60 operates fully, and contacts 68 and 64 close to extend the ground on wiper 53 through break contacts 105 and 104 on the finder tens and units magnets 103 and 102, respectively, over the following path: wiper 53, contacts 68, contacts 104, contacts 64, contacts 105, and wiper 54. The connection is now extended through wiper 54 to the allotter tens magnet 106 to energize the same over the following path: wiper 54, contacts 37, armature 115, tens stepping magnet 106, and battery.

When tens stepping magnet 106 operates, it closes an operating circuit to the tens stepping magnet 103 of the finder-selector link 17 through wiper 56 of the rotary distributor switch 50 over the following path: ground, contacts 108, armature 33, armature 111, wiper 56, magnet 103 and battery. Hence magnets 106 and 103 operate and release successively as long as wiper 53 remains grounded. Magnet 103 operates contacts 105 to provide an interrupting circuit for the stepping of magnet 106. After the first step, A. T. O. N. contacts 23 close and F. T. O. N. contacts 83 close.

When wiper 59 is advanced to the tens marking lead, T–1 to T–0, corresponding to the calling line as marked by the marking circuit 16*a*, in this case T–1, the control grid of tube 57 is driven negative, thereby causing relay 40 to restore.

The restoring of relay 40 removes ground from wiper 53 by opening contacts 42 over a previously described path, thereby stopping the operation of magnets 106 and 103. Contacts 41 close to energize relay 110 over the following path: ground, armature 34, contacts 41, armature 35, armature 113, relay 110, armature 31, A. T. O. N. contacts 23, contacts 107, magnet 106 and battery. The magnet 106 does not operate in series with the relay 110.

Relay 110 operates, and armature 114 transfers to complete a locking circuit for relay 110. Armature 118 transfers to place ground on the SC lead. Armature 117 transfers to place battery through resistor 119 to the wiper 59 of the tens switch 58 of the call allotter and armature 116 operates to transfer the control grid of tube 57 to wiper 121 of the units switch 120 of the call allotter 16 over the following path: wiper 121, contacts 78, armature 116, armature 39 and the control grid of tube 57.

The removal of the negative potential from the control grid of tube 57 causes relay 40 to re-operate and complete a ground connection to wiper 53, which is now connected to the allotter units magnet 122 over the following path: battery, magnet 122, armature 115, armature 37, wiper 54 and contacts 105, 64, 104 and 68. When magnet 122 operates, it closes contacts 124 to complete an operating circuit to the finder units magnet 102 through wiper 55 of the distributor switch 50 over the following path: ground, contacts 124, armature 33, armature 111, wiper 55, magnet 102 and battery. The contacts 104 provide an interrupting circuit to step magnet 122 and after the first step A. U. O. N. contacts 19 close and F. U. O. N. contacts 81 close. Hence the allotter units magnet 122 and the finder units magnet 102 operate and release successively as long as wiper 53 remains grounded.

When wiper 121 is advanced to the units marking lead, U–1 to U–0, corresponding to the calling line as marked by the marking circuit 16*a*, in this case U–1, the control grid of tube 57 is again driven negative over a path previously described, thereby rendering the tube 57 nonconductive. As a result thereof, relay 40 restores, thereby removing ground from wiper 53 to interrupt the operation of magnets 122 and 103 by opening contacts 42. Contacts 41 close to energize slow-to-release relay 70 in series with magnet 122 over the following path: ground, armature 34, contacts 41, armature 35, armature 113, contacts 73, relay 70, armature 32, A. U. O. N. contacts 19, contacts 123, magnet 122 and battery. Magnet 122 does not operate in series with relay 70.

Relay 70 operates, and make contacts 74 close before break contacts 73 open to complete a locking circuit for relay 70. Contacts 77 close to transfer the control grid of tube 57 to wiper 52 over the following path: control grid of tube 57, armature 39, armature 116, contacts 77 and wiper 52. Contacts 79 close to ground wiper 51 of the rotary distributor switch 50.

At contact 77 ground is connected to the grid of tube 57, namely by way of armature 39′, contacts 77, 116 and armature 39. Consequently, tube 57 becomes conductive again and relay 40 reoperates, thereby at 42 preparing a point in the circuit of distributor magnet 125.

When start conductor SC was grounded at armature 118, tube 15 was rendered conductive and relay 20 reoperated, opening the original locking circuit of relay 30. Relay 70, in operating as just described, opens another locking circuit for relay 30 at contact 71.

Relay 30 releases and armatures 31 and 32 restore to normal position to release relays 110 and 70, and also causes the allotter tens and units switches 58 and 120 to operate in a self-interrupting manner to return to home position in succession. After the release of relay 30 and prior to the release of relay 70 ground is maintained on the grid of tube 57 by way of contacts 72, 42, 75, 77, 116 and armature 39; furthermore, ground is returned from the finder, Fig. 4, by way of wiper 52 as described hereinbelow. When relay 70 finally restores another point in the circuit of distributor magnet 125 is closed at contact 76.

When the call allotter tens and units switches 58 and 120 reach the home position, a driving circuit is completed for the operation of the rotary distributor magnet 125 of the rotary distributor switch 50 over the following path: battery, magnet 125, contacts 163, contacts 38, contacts 76, contacts 42, A. U. O. N. contacts 18, armature 32, A. T. O. N. contacts 22, armature 31 and ground. The stepping magnet 125 self-interrupts its operating circuit through contacts 163 until the distributor switch 50 encounters an idle line finder, whereupon the negative potential impressed on wiper 52 thru the lower winding of relay 60 in the idle finder renders the tube 57 nonconductive. As a result thereof, relay 40 restores and contacts 42 break to interrupt the driving circuit to magnet 125. The restoration of relay 40 closes contacts 41 to complete an operating circuit for relay 30 over a previously described path to start a second cycle of operations in the event that another call is waiting to be answered.

It was assumed, heretofore, that only one call was waiting to be answered. In the event that several calls are initiated simultaneously, it is necessary that a tens marking be selected and then a units marking in the selected tens group be selected. For example, if calls are initiated over lines 25 and 33 at the same time, the allotter tens switch 58 will be stopped on the second step. Stopping of the allotter's units switch 120 must then be dependent solely on the marking of lead U–5 by line 25, for if line 33 is permitted to mark lead U–3, the finder will be switched through to line 23.

The desired result is achieved by the ground placed on the common start lead SC at contacts 118 and the battery thru resistance 119 placed on the selected tens marking lead, T–2 in this case, through armature 117, when marker relay 110 is operated. All of the tens marking leads, T–1 to T–0, except T–2, are thus shunted to ground through rectifiers such as 126 and 128, and resistors such as 129 and 131 individual to each tens group of lines. The individual start leads, S–11 to S–00 of all lines, except those in the twenty group, are shunted to ground through rectifiers 14 and 164—168, thus preventing marking of leads U–1 to U–0 by lines not in the twenty group. The battery thru resistance 19 placed on the selected tens marking lead T–2 through the tens switch 58 resting on the selected tens group prevents the shunting of the start leads S–21 to S–20. Resistor 130 limits the current flow through rectifier 127 due to the resistance battery applied to the selected tens marking lead T–2. The start leads, S–21 to S–20, are thus enabled to mark the corresponding units marking leads, U–1 to U–0, through rectifiers such as 195 and 196 independently of the shunting of the start leads in the other groups.

Resistor 119 is merely a protective resistor and plays no part in the circuit functions.

When relay 60 operated, contacts 61 and 62 closed to connecting the pulse generator leads P–1A and P–1B to the primary windings of transformers 133 and 134, respectively. Alternating or pulsating voltage pulses of rectangular wave form are impressed on leads P–1A and P–1B by a common pulse generator of a conventional type. The frequency of these voltages may be in the order of 20,000 cycles per second. The ratio of the duration of alternate pulses is made equal to $2N-1$, where N is the number of finders per group. When N equals 10, this ratio is 19, therefore, lead P–1A is negative during 5% of a cycle and positive, or zero, during the remaining 95% of a cycle. Similarly, lead P–1B is negative during 5% of a cycle and positive, or zero, during the remainder of the cycle, but the phase relations are such that the negative pulse on P–1B occurs one half of a full cycle out of phase with respect to the negative pulse on P–1A. The other finders are supplied with similar voltages displaced in phase by 5% of a cycle per finder. Thus, negative pulses are applied to the transformers in the finder-connectors, similar to transformer 133 of finder-connector 17, in succession, and then are applied to the transformers in the finder-connectors, similar to the transformer 134 of finder-connector 17, in succession. The secondary voltages of the transformers, similar to transformers 133 and 134, will be alternating in character when either pulsating or alternating voltages are impressed on the primaries. Since there can be no direct component transmitted through a transformer, it follows that the magnitude of the secondary voltage during successive one-half cycles will be in the ratio of 19:1.

Rectifiers 135′—138′ are connected to the secondary winding of transformer 133 through resistors 135 and 136, and to positive and negative sources of potential through resistors 137 and 138, in such a manner as to be normally non-conductive. During the period when lead P–1A is negative, transformer 133 reverses the potential across rectifiers 135′—138′, thereby rendering them conductive. Connected to the midpoint between rectifiers 137′, 138′ is the control grid of electron tube 139 which functions to amplify both signals and speech outgoing from the calling substation; and connected to the junction point of rectifiers 135′, 136′ is the speech output circuit extending through plate condenser 236 of tube 207 which functions to amplify both signals and speech incoming from the called substation, and also connected to this last-mentioned junction point is condenser 139′ through which various tones may be transmitted back to the calling substation. Thus the path in link 17 which serves for the transmission in the direction from the calling substation and the path which serves for the transmission in the opposite direction are normally, that is during the time that lead P–1A is positive or zero, effectively disconnected from each other and from wipers FUA, FUB and FTA, FTB of the two finder switches, and are effectively connected to each other and, by way of the two units rectifiers 140, 141 and the corresponding two tens rectifiers, respectively, to the last-mentioned wipers only during the brief interval that lead P–1A is negative. It will readily be seen that the last-mentioned four rectifiers which are connected in series with the corresponding finder switch wipers, likewise are conductive only during the above-mentioned polarity reversal due to the negative pulse on lead 1–A. Thus these four rectifiers prevent the reverse potential momentarily impressed across rectifiers 137′, 138′ and 135′, 136′, of one link from affecting, by way of the bank multiple of these switches, the state of conductivity of rectifiers 137′, 138′ and 135′, 136′ of another link. The positive and negative sources of potential connected to resistors 137 and 138 may be a separate source of potential balanced with respect to the negative terminal of the conventional exchange battery.

Figure 3:
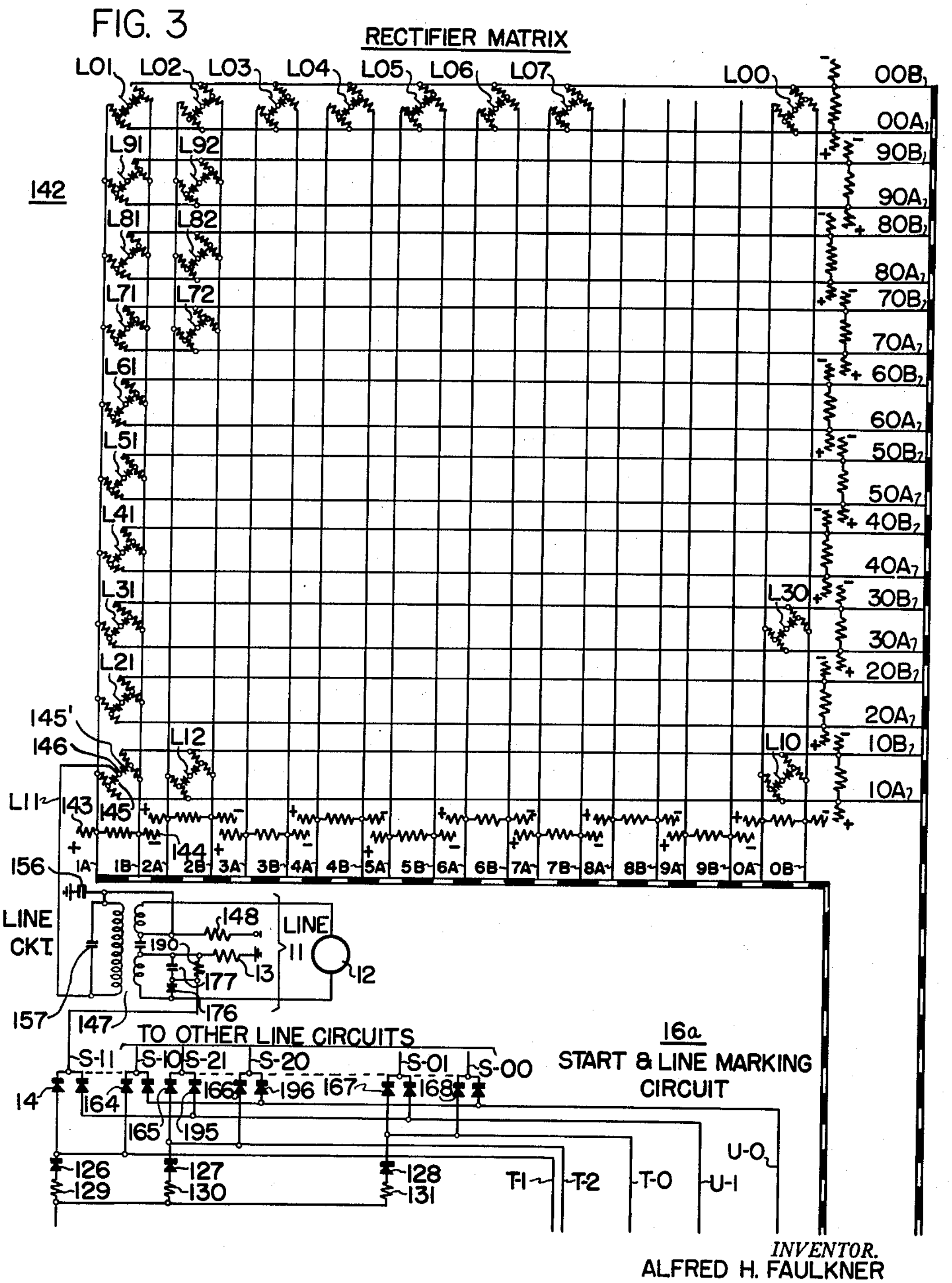
Figure 3 is a schematic diagram of the rectifier matrix for extending connections between the line circuits and the finder-connector switch.

For extending connections from the line circuits, a rectifier matrix 142 or a co-ordinate array of asymmetrical conductors, shown in Figure 3, is herein provided in the preferred embodiment, and comprises ten pairs of vertical bus wires and ten pairs of horizontal bus wires to which four resistors and two rectifiers are connected at each intersection. One bus wire of each pair is connected to a source of positive potential through a resistor, such as resistor 143, and the other bus wire of each pair is connected to a source of negative potential through a resistor, such as resistor 144. These sources of potential are balanced with respect to negative battery and may be the same sources as those which are connected to the secondary winding of transformer 133. In view of the above-mentioned potential condition of the bus wires it will be apparent from Fig. 1 that at each intersection one series combination of two resistors normally has a positive potential connected to both its ends and the opposite series combination of two resistors normally has a negative potential connected to both its ends. As shown in Fig. 1 the rectifiers such as rectifiers 145 and 145′ which are connected, in series relation to each other, between the junction points of the aforementioned two resistance combinations are poled in such a way that they are normally rendered non-conductive by the potentials impressed on the bus wires through the resistors such as 143 and 144. Thus, the junction of each pair of rectifiers, such as point 146, is, in effect, normally disconnected from the bus wires. Each junction point, such as point 146, is connected through the secondary of the line transformer, such as transformer 147 of line 11, to negative battery through a resistor, such as resistor 148 of the line circuit of line 11, and thereby each intersection is individual to a particular line circuit.

When call allotter 16 operated in response to the initiation of a call over line 11, the wipers 153 and 154 of the finder tens switch 149 were connected to the lowermost of the horizontal pair of bus wires, 10A and 10B, respectively, and the wipers 151 and 152 of the finder units switch 150 were connected to the extreme left vertical bus wires, 1A and 1B, respectively. Thus, as a consequence of the reversal of potential across rectifiers 137′, 138′ and 135′, 136′, Fig. 2, during the time that lead P–1A is negative which reversal renders the last-mentioned four rectifiers as well as units rectifiers 140, 141 and the corresponding tens rectifiers in the link conductive as explained above, the potential between bus wires 1A and 1B and that between bus wires 10A and 10B also is reversed, thereby rendering rectifiers 145 and 145′, Fig. 3, likewise conductive during this interval. The magnitude of reversed potential on the selected horizontal and vertical pairs of bus wires is less than the normal potential thereon so that all the rectifiers in the selected horizontal and vertical rows, except those at the intersection, remain non-conductive. Thus conductor L11, Fig. 1, which is associated with line circuit 11 is individually connected to the aforementioned two one-way transmission paths in link 17, Fig. 2. Keeping in mind that each of these rectifiers while in its conductive state establishes what amounts to a direct connection between its terminals it will also be noted that the particular rectifier-resistance network in matrix 142 with which conductor L11 is associated has thus acted to extend this conductor to link 17 over the very two pairs of bus wires 1A, 1B, and 10A, 10B in parallel over which the state of conductivity of this network is controlled. Furthermore it will be understood that because of the balanced way in which conductor L11 is connected to the two resistance pairs of its associated network, modulation of the signals transmitted over this conductor by the control voltages impressed on the network over the bus wires is avoided. Condenser 209 is thus charged, or discharged, to the potential appearing across condensers 156 and 157 of the line circuit of line 11, during the short interval when the grid of tube 139 is connected to the line circuit. The condenser acts as a delay or storage element to hold this charge substantially unaltered during the open intervals. The voltage drop across resistor 148 due to line current is thus transferred to the control grid of tube 139, causing it to energize relay 160, the plate circuit of tube 139 extending to ground by way of wiper 51 of the rotary distributor switch 50 in the call allotter 16.

Relay 160 operates, and contacts 161 close to energize slow-to-release relay 90. Slow-to-release relay 90 operates and contacts 92 close to prepare the finder-connector 17 for impulsing. Contacts 94 close to ground wiper 52 to step the call allotter 16 to a succeeding link in a manner previously described, the plate circuit of tube 139 being maintained closed at armature 191.

When relay 60 operated, contacts 69′ closed to energize relay 170 over the following path: battery, lower winding of relay 170, contacts 69′, C. T. O. N. contacts 100 and ground. Relay 170 operates and contacts 171 close to complete the impulsing circuit to the connector tens magnet 178.

Condenser 139′ is normally connected to a hold tone lead 175, on which an alternating voltage having a suitable frequency of 7,000 cycles per second is impressed thereon. This voltage appears across condenser 157 causing a similar voltage to appear across the primary winding of the line transformer 147. The hold tone voltage appearing across the lower primary winding of transformer 147 is rectified by suitable means, such as rectifier 176 of the line circuit of line 11 and filtered by condenser 177. The resultant direct voltage across resistor 190 is poled for opposing the potential across resistor 13 and thus wipes out the start signal on lead S–11. The removal of start potential on lead S–11 maintains the tube 15 conductive after the opening of armature 118 during the release of the call allotter which takes place in the manner previously described upon the releasing of relay 30.

Condenser 156 is made large enough so that the major portion of speech signals impressed on the lead L–11 appears across condenser 157, but yet small enough so that impulsing signals resulting from interruption of the line current will appear on lead L–11. Interruptions in line current also produce transient impulses across the secondary winding of transformer 147, which may be poled so that the transient pulses reinforce the voltage across the condenser 156, and thus tend to produce rectangular pulses on lead L–11.

Each time that line 11 is opened, the control grid of tube 139 is driven negative, thereby causing a decrease in plate current and a resultant releasing of relay 160. Contacts 162 close to energize the tens magnet 178. The pulsing circuit is now completed to the connector tens magnet 178 over the following path: battery, magnet 178, contacts 181, contacts 171, contacts 92, contacts 162 and ground. In response to the first series of digital impulses from the calling line, relay 160 is pulsed causing contacts 162 to operate in response thereto, thereby stepping the tens magnet 178 of the connector. Magnet 178 operates a rotary switch 200 of the connector for extending wipers 201 and 202 to the desired called line group.

On the first step of the connector tens switch 200, the C. T. O. N. (connector tens off-normal) springs operate, opening the original operating circuit to the lower winding of relay 170 at contacts 100. Slow-to-release relay 170 is held operated during impulsing due to the current impulses thru its upper winding which is connected in parallel with magnet 178. Relay 90 also remains operated during pulsing due to its slow-to-release characteristics.

At the end of the first series of digital impulses, relay 170 releases, and contacts 172 close to energize relay 180 over the following path: battery, upper winding of relay 180, contacts 172, armature 93, C. U. O. N. contacts 98, armature 97, C. T. O. N. contacts 101 and ground. Relay 180 operates, and contacts 183 close to reoperate relay 170 over the following path: battery, lower winding of relay 170, contacts 183, armature 93, contacts 98, armature 97, contacts 101 and ground.

Relay 170 operates and contacts 171 close to complete an impulsing circuit to the connector units magnet 203 to step the units connector switch 204 to the called line in response to the second series of digital impulses. Magnet 203 is operated in accordance with the second series of digital impulses of the called number transmitted by the calling line over the following path: battery, magnet 203, contacts 182, contacts 171, contacts 92, contacts 162 and ground.

Operation of relay 170 also transfers at contacts 173, the upper winding of relay 180 to ground by way of contacts 184. On the first step of the units connector switch 204, C. U. O. N. contacts 98 are opened to open the original operating circuit to the lower winding of relay 170. Relay 170 is held operated during impulsing thru its upper winding as explained. Relay 170 restores upon the completion of the second series of digital impulses and opens the operating circuit to slow-to-release relay 180 at contacts 173.

The wipers 201, 202, 205 and 206 of the connector extend a connection to the called line circuit through the rectifier matrix 142 in a similar manner as did the finder switches. The pulsing circuit impressed on transformer 134, and the rectifiers 238, 239, 240 and 241 function in a similar manner as did the corresponding parts of the finder.

In the event that the called line is busy, the control grid of tube 207 will be driven positive due to the voltage drop across a resistor in the called line circuit, similar to resistor 148 of the line circuit of line 11. Relay 210 is operated, and, before slow-to-release relay 180 restores after restoration of relay 170, contacts 211 close to complete a locking circuit to relay 180 over the following path: battery, lower winding of relay 180, contacts 185, contacts 211, contacts 174, armature 95, C. U. O. N. contacts 99, armature 97, C. T. O. N. contacts 101 and ground.

When contacts 212 of relay 210 closed, a busy tone circuit was completed to the calling line over the following path: busy tone contacts 188, contacts 212, condenser 139′, finder switch 149, and the line circuit to line 11. Contacts 213 open the hold tone lead. The busy tone lead is connected to a source of alternating voltage having a suitable frequency in the speech range, such as 1,000 cycles per second. The busy tone voltage is effective to wipe out the start signal voltage on the line marking lead S–11 in a manner similar to that described for the hold tone voltage, but the busy tone voltage also produces an audible signal in the calling party's receiver, whereas the hold tone voltage does not. If necessary, the response of the receiver may be suitably reduced above the speech range to prevent the receiver from reproducing the hold tone. The calling party may release the connection or may wait until the called line becomes idle.

In the event that the called line is idle at the time that relay 170 rstores, or subsequently becomes idle, relay 210 will be restored. Relay 180 then restores and contacts 187 close to complete an energizing circuit for relay 220 over the following path: battery, relay 220, contacts 233, contacts 187, contacts 174, armature 95, contacts 99, armature 97, contacts 101 and ground.

Relay 220 operates, and contacts 223 close and contacts 224 break to transfer the condenser 139′ from the hold tone lead to the ring back tone lead to return an audible signal to the calling party. Contacts 221 close to connect the ringing tone lead to the called party through condenser 235. The ringing tone does not operate the ringer in the called substation directly, as the rectifier matrix 142 is not intended to transmit such a large amount of power. However this tone may trigger a suitable means in the called party substation, such as a cold-cathode relay tube, to cause the ringer thereat to be energized from a local source of power. The ringing tone charges a condenser in the called line circuit, similar to condenser 177 of the line circuit of line 11, to prevent marking of the start circuit when the called party answers.

When the called party answers, the control grid of tube 207 is driven positive causing relay 210 to operate and close a circuit to relay 230 over the following path: battery, relay 230, contacts 234', contacts 186, contacts 211, contacts 174, armature 95, contacts 99, armature 97, contacts 101 and ground. Relay 230 operates, and contacts 234 close to complete a locking circuit for relay 230. Contacts 233 open to release relay 220 and contacts 232 close to complete a multiple circuit to relay 90. Contacts 231 close to couple the calling and called lines by connecting the plate of tube 207 through condenser 236 to the junction of rectifiers 135' and 136'. Contacts 237 close to connect the plate of tube 139 through condenser 242 to the junction of rectifiers 238 and 239.

During the intervals when lead P–1A is negative, the voltage across condenser 209 is adjusted to match the potential of the calling line, plus a direct component due to the constant voltage across condenser 156. This voltage appears in amplified form across the plate load resistor 215 of tube 139. During the intervals when lead P–1B is negative, the voltage across the called line is varied by reason of its connection to the plate of tube 139 through condenser 242. In a similar manner, tube 207 causes the voltage across the calling line to vary in accordance with variations in voltage across the called line. The gain of tubes 139 and 207 is limited to a value less than the losses around the loop circuit of the called and calling lines to avoid sustained oscillations.

When the calling party restores the handset, relay 160 releases, and when the called party restores the handset, relay 210 releases. Upon the restoration of both relays 160 and 210, relay 90 restores and releases relays 60 and 230, and also homes the connector tens and units switches 200 and 204, and the finders tens and units switches 149 and 150 in succession. In the event that the finder-connector is seized by the call allotter while the switches are being homed, relay 60 operates its contact 69 only, thus delaying the call allotter until the finder-connector is fully restored to normal.

It is to be understood that variation and modifications may be effected without departing from the scope of the appended claims.

I claim:

1. In a combination adapted for use in a telephone system, a calling line circuit, a first means for extending connections from said calling line circuit, a called line circuit, a rectifier matrix connected to said calling and called line circuits, and circuit means in said first means controlled over said calling line circuit for rendering conductive selected rectifiers of said matrix to complete a connection from said calling line circuit to said called line circuit through said selected rectifiers.

2. In a combination adapted for use in a telephone system, a group of line circuits, a co-ordinate array of asymmetrical conductors connected to said line circuits, each intersection thereof individual to a particular line circuit of said group, and means controlled over one of said line circuits for rendering conductive the asymmetrical conductors of the intersection individual thereto and rendering conductive the asymmetrical conductors of the intersection individual to another of said line circuits for completing a communication circuit between said one line circuit and said other line circuit through said conductive asymmetrical conductors.

3. In a combination adapted for use in a telephone system, a group of line circuits, an asymmetrical conductor matrix connected to said line circuits, each intersection thereof individual to a particular line circuit, a source of potential connected to said asymmetrical conductors rendering said asymmetrical conductors non-conductive, switching means operatively controlled by one of said line circuits for extending connections to the asymmetrical conductor in the intersection individual thereto and to the asymmetrical conductor in the intersection individual to another of said line circuits, and a variable source of potential in said switching means rendering the asymmetrical conductors in the intersection individual to said one line circuit and said other line circuit conductive, whereby a communication circuit is established between said one line circuit and said other line circuit.

4. In a combination adapted for use in a telephone system, a group of line circuits, a co-ordinate array of asymmetrical conductors connected to said line circuits, each intersection thereof individual to a particular line circuit, a source of fixed potential connected to said asymmetrical conductors rendering said asymmetrical conductors non-conductive, switching means operatively controlled by one of said line circuits for extending connections to the asymmetrical conductor in the intersection individual thereto and to the asymmetrical conductor in the intersection individual to another of said line circuits, and a pulsating current circuit in said switching means rendering the asymmetrical conductors in the intersections individual to said one line circuit and said other line circuit conductive, whereby a communication circuit is established between said one line circuit and said other line circuit.

5. In a combination adapted for use in a telephone system, a group of line circuits, a co-ordinate array of asymmetrical conductors connected to said line circuits, each intersection thereof individual to a particular line circuit of said group, switching means controlled over one of said line circuits connecting said switching means to the asymmetrical conductor in the intersection individual thereto and connecting said switching means to the asymmetrical conductor in the intersection individual to another of said line circuits, means in said switching means rendering the asymmetrical conductors in the intersections individual to said one line circuit and said other line circuit conductive, and an electronic circuit interconnecting said conductive asymmetrical conductors, whereby a communication circuit is established between said one line circuit and said other line circuit.

6. In a combination adapted for use in a telephone system, a group of line circuits, a co-ordinate array of asymmetrical conductors connected to said line circuits, each intersection thereof having a pair of said asymmetrical conductors individual to a particular line circuit of said group, a source of potential rendering said asymmetrical conductors non-conductive, switching means operatively controlled by one of said line circuits for extending a connection to the pair of asymmetrical conductors in the intersection individual thereto and to another pair of asymmetrical conductors in the intersection individual to another of said line circuits, and means in said switching means rendering said asymmetrical conductors in the intersections individual to said one line circuit and said other line circuit conductive for establishing a communication circuit between said one line circuit and said other line circuit.

7. In a combination adapted for use in a telephone system, a group of line circuits, a co-ordinate array of asymmetrical conductors connected to said line circuits, each intersection thereof individual to a particular line circuit of said group, switching means operatively controlled by one of said line circuits for extending a connection to the asymmetrical conductor in the intersection individual thereto and to the asymmetrical conductor in the intersection individual to another of said line circuits, a first pulsating current circuit in said switching means rendering the asymmetrical conductor in the intersection individual to said one line circuit conductive, a second pulsating current circuit in said switching means rendering the asymmetrical conductor in the intersection individual to said other line circuit conductive, a first electronic circuit interconnecting said first and second pulsating current circuits, and a second electronic circuit interconnecting said first and second pulsating current circuits, whereby a communication circuit is established between said one line circuit and said other line circuit.

8. In a combination adapted for use in a telephone system, a relayless line circuit, a call allotter seized by said line circuit, a line finder operatively controlled by said call allotter for extending a connection from said line circuit, a tone circuit in said line finder transmitting a tone current to said line circuit, and means in said line circuit responsive to said tone current for releasing said call allotter.

9. In a combination adapted for use in a telephone system, a substation, a line circuit associated with said substation having a source of potential therein, a call allotter having access to said line circuit, an asymmetrical-resistor network in said line circuit controlling the application of said source of potential in response to the operation of said substation for seizing said call allotter, a switch having access to said line circuit for extending a connection therefrom, means in said allotter controlled by said substation for causing said switch to seize said line circuit, a tone circuit in said switch transmitting tone current to said line circuit, and a rectifier circuit in said line circuit rectifying the tone current transmitted by said tone circuit and poled to oppose said source of potential to release said call allotter.

10. In a combination adapted for use in a telephone system, a substation, a line circuit associated with said substation having a source of potential therein, a call allotter having access to said line circuit, an asymmetrical-resistor network in said line circuit controlling the application of said source of potential in response to the operation of said substation for seizing said call allotter, a switch having a rectifier matrix therein for establishing a connection from said substation, means controlled by said substation causing said switch to seize said line circuit through said matrix, a tone circuit in said switch transmitting tone current to said line circuit through said matrix, and means in said line circuit rectifying the tone current transmitted by said tone circuit and poled to oppose said source of potential to release said call allotter.

11. In a combination adapted for use in a telephone system, a group of line circuits, a group of line finders having access to said line circuits for extending a connection therefrom, a call allotter seized by one of said line circuits for selecting an idle finder of said group, common finder means in said call allotter, a testing circuit in said call allotter controlling the operation of said finder means in direct response to a marking condition set up in said one line circuit for setting said finder means on said one line circuit, and stepping means in said idle line finder operated in response to the operation of said common finder means for stepping said idle line finder to establish a connection between said idle line finder and said one line circuit.

12. In a combination adapted for use in a telephone system, a group of line circuits, a group of line finders having access to said line circuits for extending a connection therefrom, a call allotter having access to said line circuits, a first electronic discharge device in said call allotter controlled by one line circuit of said group for seizing said call allotter, means in said call allotter selecting an idle finder of said group for extending a connection from said one line circuit, common finder means in said call allotter, a second electronic discharge device in said call allotter controlling the operation of said finder means in response to a condition on said one line circuit for setting said finder means on said one line circuit, and stepping means in said idle line finder operated in response to the operation of said common finder means for stepping said idle line finder to establish a connection between said idle line finder and said one line circuit.

13. In a telephone system, a plurality of groups of line circuits, a call allotter having access to said groups of line circuits, means in said line circuits for seizing said call allotter, a first switch in said call allotter for extending a connection to said line circuits, a second switch in said call allotter for extending a connection to said line circuits, a marker circuit controlled over said line circuits for marking the condition thereof on said switches, a testing circuit in said call allotter effective in response to the marking on said switches for controlling the operation of said switches in extending a connection to a calling line circuit, and a marking relay in said call allotter operative in response to the completion of the testing circuit for said first switch for distinctly controlling over said first switch the marking of the group of line circuits reached by said switch, whereby in the event of simultaneous calls from said group and one or more other groups of line circuits the operation of said second switch in selecting a calling line circuit of said first group is insured.

14. In a telephone system, a number of line circuits each comprising a resistance network, a plurality of individual line finders having access to said line circuits, a finder common to said individual line finders comprising start means and stop means and having access to said line circuits by way of a plurality of marking conductors connecting with said resistance networks, a circuit including said resistance network and responsive to the closure of a calling loop over the associated line for operating said start means and shifting the potential on one of said conductors, thereby to mark said line to said common finder as being in calling condition, said stop means being responsive to said marking potential for stopping said common finder in the position thus marked, and means controlled by said common finder for positioning one of said individual line finders on a corresponding position.

15. In a telephone system, a number of line circuits each belonging to two groups corresponding to the two coordinates of a coordinate system and each comprising a resistance network, a plurality of line finders having access to said line circuits, first-coordinate finder means and second-coordinate finder means for controlling said line finders and having access to said resistance networks via a group of first-coordinate and second-coordinate marking conductors respectively, start and stop means associated with said finder means, a circuit including said resistance network and responsive to the closure of a calling loop over the associated line for operating said start means and shifting the potential on the associated first-coordinate and second-coordinate marking conductor to set up a marking potential thereon, said stop means being operative in response to the marking potential on said marking conductors for respectively stopping said two finder means in the two positions marked.

16. In a telephone system, a number of line circuits each belonging to two groups corresponding to the two coordinates of a coordinate system and each comprising a resistance network, a plurality of line finders having access to said line circuits, first-coordinate finder means and second-coordinate finder means for controlling said line finders and having access to said networks via a group of first-coordinate and second-coordinate marking conductors respectively, control means associated with said finder means, a circuit including said network and responsive to the closure of a calling loop over the associated line for shifting the potential on the associated first-coordinate and second-coordinate marking conductors to set up a marking potential thereon and causing said control means to start said first-coordinate finder means, said control means being operative in response to the marking potential on said first-coordinate marking conductor for stopping said first-coordinate finder means in the position marked, starting said second-coordinate finder means and exerting over said first-coordinate marking conductor a control for permitting a second-coordinate marking to be effective only for line circuits of said one first-coordinate group, whereby a false setting of said second-coordinate finder means in the case of overlapping calls from a plurality of first-coordinate groups is avoided, and being operative in response to the marking potential on said second-coordinate marking conductor for stopping said second-coordinate finder means in the position marked.

17. In a telephone system a number of line circuits; a plurality of individual line finders having access to said line circuits; control means common to a plurality of said line finders, said common control means comprising distributor means for preselecting an idle line finder, common finder means having access to said line circuits and operable to direct said individual finder onto the calling line, a testing device connected to said common finder means and change-over means controlled by said testing device; means associated with said line circuits and responsive to the initiation of a call on one of said lines for starting said common finder means and applying a marking potential to said last-mentioned means; said testing device being operative in response to said marking potential for stopping said common finder means on said calling line, said change-over means being responsive to the actuation of said testing device for starting said distributor means and transferring said testing device from said finder means to said distributor means, and said testing device being subsequently responsive to an idle finder being found by said distributor means for stopping the last-mentioned means on said finder.

18. In a telephone system the combination as defined in claim 17 and further characterized in that said testing device includes an electronic discharge device having an electrode connected to said common finder means, that said discharge device is responsive to said marking potential to change its state of conductivity for stopping said common finder means on said calling line, that said change-over means is effective upon actuation to reset said discharge device to its former state of conductivity, start said distributor means and transfer said electrode from said finder means to said distributor means, and that said discharge device is subsequently responsive to a potential characterizing an idle finder for stopping the distributor means on said finder.

19. In a signaling system, a switching device comprising a series combination of two rectifier means, two control conductors for controlling said device and having potentials of opposite polarity normally connected thereto, said series combination of rectifier means being connected between said two control conductors so as to normally oppose current flow therethrough, a signaling circuit including a signaling conductor connected to the junction point of said two rectifier means, and means for reversing the polarity of said potentials, said switching device being rendered conductive in response to said reversal for extending said circuit from said signaling conductor over said two control conductors in parallel.

20. In a signaling system, a switching device comprising a network of impedances and rectifier means, two control paths for controlling said device, a signaling circuit including a signaling conductor, said impedances being connected between said two control paths, said signaling conductor being connected by way of said rectifier means to the junction point of said impedances and said rectifier means being poled so as to normally prevent current flow therethrough, and means for simultaneously changing the potential condition on both of said control paths, said switching device being rendered conductive in response to said potential changes for extending said circuit from said signaling conductor in simplex over said two control paths.

21. In a telephone system, a switching device comprising a series combination of two rectifier means, two control conductors for controlling said device and having potentials of opposite polarity normally connected thereto, said series combination of rectifier means being connected between said two control conductors so as to normally oppose current flow therethrough, a transmission path connected to the junction point of said two rectifier means, means for applying voice frequencies to said transmission path, and means for reversing the polarity of said potentials, said switching device being rendered conductive in response to said reversal for extending said transmission path over said control conductors in parallel.

22. In a telephone system, a switching device comprising a network of impedances and rectifier means, two control paths for controlling said device, a transmission path, means for applying voice frequencies to said transmission path, said impedances being connected between said two control paths, said transmission channel being connected by way of said rectifier means to the junction point of said impedances and said rectifier means being poled so as to normally prevent current flow therethrough, and means for simultaneously changing the potential condition on both of said control paths, said switching device being rendered conductive in response to said potential changes for extending said transmission path in simplex over said two control paths.

23. In a telephone system, a plurality of lines, a coordinate array of impedance networks each including asymmetrical conductors and each having one of said lines individually connected thereto, a first-coordinate and a second-coordinate group of control paths for controlling said networks, each of said networks being interposed in simplex fashion in a circuit including the corresponding line and the corresponding first-coordinate and second-coordinate control paths, and means for simultaneously impressing control voltages to the far end of a predetermined set of first-coordinate and second-coordinate control paths, the network corresponding to the crosspoint of said two control paths being rendered conductive in response to the impression of said control voltages for extending said circuit from the corresponding line over both control paths in parallel.

24. In a telephone system, a plurality of lines, a circuit extending over each of said lines, a coordinate array of switching devices each comprising two impedances and a series combination of two rectifier means and each having one of said lines individually connected thereto, a first-coordinate and a second-coordinate group of pairs of control conductors for controlling said devices, the two conductors of each pair having a potential of opposite polarity normally connected thereto, each of the two impedances of each device being connected between equally poled conductors from the corresponding first-coordinate and second-coordinate conductor pairs, said series combination of rectifier means being connected between the midpoints of the two impedances so as to normally oppose current flow therethrough and the corresponding line being connected to the junction point of said two rectifier means, and means for simultaneously setting up potentials of reverse polarity and lesser magnitude as compared with said normal potentials on a predetermined set of first-coordinate and second-coordinate conductor pairs, only the switching device corresponding to the crosspoint of said two conductor pairs being rendered conductive in response to the setting up of said reverse potentials for extending said circuit from the corresponding line over both of said conductor pairs in parallel.

25. In a telephone system, a plurality of lines, a coordinate array of impedance networks, each network including rectifier means and each having one of said lines individually connected thereto, a switch comprising first-coordinate and second-coordinate selecting means having access to said networks over a first-coordinate and a second-coordinate group of control connections respectively, each of said networks being interposed as a swtching element in a circuit including the corresponding line and the corresponding control connections, and means in said switch for simultaneously impressing, upon the setting of said selecting means, control voltages by way of said last-mentioned means on a predeterminetd set of first-coordinate and second-coordinate control connections to render the network corresponding to the crosspoint of said connections conductive, whereby said circuit is extended from the corresponding line to said switch by way of said network, said control connections and said selecting means.

26. In a telephone system, a plurality of switches, a plurality of lines, a coordinate array of line switching means of the unidirectionally conducting type common to said switches, a first-coordinate and a second-coordinate group of control connections to said line switching means also common to said switches, each of said line switching means having one of said lines connected thereto and being interposed as a switching element in a circuit including said line and the corresponding control connections, each of said switches comprising first-coordinate and second-coordinate selecting means having access to said two groups of control connections respectively and also comprising a transmission path and a switching device of the unidirectionally conducting type interposed as a switching element between said selecting means and said path, circuit means for feeding time-spaced control pulses to said switches, a different pulse for each switch, said pulse being impressed by way of said selecting means on a predetermined set of first-coordinate and second-coordinate control connections to render the switching device corresponding to the crosspoint of said connections conductive and being simultaneously impressed on the switching device in said switch to render the last-mentioned device conductive whereby said circuit is extended from the corresponding line to said transmission path by way of said line switching means, said control connections, said selecting means and said switching device.

27. In a telephone system, a plurality of lines, means for applying numerical D. C. impulses as well as voice frequencies to any of said lines, a plurality of links, circuit means for feeding time-spaced control pulses in rapidly repeated cycles to said links, a different pulse per cycle for each link, common calling line detecting means, a plurality of line switching means of the unidirectionally conducting type common to said links each having one of said lines connected thereto, each of said links comprising non-numerical and numerical selecting means, said non-numerical selecting means having access to said line switching means and being set under the control of said calling-line detecting means, link switching means of the unidirectionally conducting type, an amplifying device, numerical-impulse responsive means connected to the output of said amplifying device, said line switching means and said link switching means being interposed in series as switching elements between a given line and the input of the amplifying device of a given link, circuit-connections for impressing said pulse by way of said non-numerical selecting means on the line switching means corresponding to said calling line to render said means conductive and simultaneously impressing said pulse on the link switching means in said link to render said last-mentioned means conductive, whereby said calling line is effectively connected to the input of the amplifying device of said link for the duration of said pulse, said impulse responsive means being operative in response to the amplified numerical D. C. impulses received from said device under the control of said calling line to set said numerical selecting means in accordance with a desired line and means operative upon such setting to establish a connection from said calling line by way of said amplifying device to said desired line for the transmission of amplified voice frequencies thereto.

28. In a telephone system, a plurality of lines, a plurality of switches, circuit means for feeding time-spaced control pulses in rapidly repeated cycles to said switches, a different pulse per cycle for each switch, a plurality of line switching means common to said switches each having one of said lines connected thereto; each of said switches comprising line selecting means having access to said line switching means, two one-way transmission paths for the transmission of signals to and from a given one of said lines respectively, and two parallel-connected switching devices of the unidirectionally conducting type for respectively controlling said two paths, said line switching means and said two parallel-connected switching devices being interposed in series as switching elements between a given line and the pair of transmission paths of a given switch, and circuit connections for impressing said pulse by way of said selecting means on the line switching means corresponding to a predetermined line to render the last-mentioned means conductive and simultaneously impressing said pulse on both switching devices in said link, whereby both said transmission paths are effectively connected to said line for the duration of said pulse but are effectively disconnected from each other and from said line at all other times.

29. In a telephone system, a plurality of lines, a plurality of switches, circuit means for feeding time-spaced control pulses to said switches, a different pulse for each switch, a plurality of line switching means of the unidirectionally conducting type common to said switches each having one of said lines connected thereto, control connections to said line switching means also common to said switches, each of said switches comprising selecting means having access to said control connections, a transmission path, rectifier means, and link switching means of the unidirectionally conducting type, said line switching means being interposed as switching elements between a given line and said control connections and said link switching means being interposed by way of said rectifier means as a switching element between said selecting means and said transmission path, both said line switching means and link switching means normally being potential-biased in a certain direction, and means controlled by said pulse for reversing, by way of said rectifier means and said selecting means, the potential on the line switching means corresponding to a predetermined line to render said means conductive and for simultaneously reversing the potential on the link switching means in said switch to render the last-mentioned means conductive, whereby said line is effectively connected to said transmission path for the duration of said pulse, said rectifier means preventing said reverse potential from feeding back into another link by way of said common control connections.

30. In a telephone system, a plurality of lines, each line having a loop circuit including a resistance in each leg, a first conductor connected to one leg and a second conductor connected to the other leg of said loop circuit, the flow of current over said loop circuit incident to the closure thereof effecting a potential change of opposite polarity on said two conductors, line detecting means having access to said first conductors and being set under the control of the potential change on said first conductor of a calling line, a calling-line supervisory device, an array of switching means of the unidirectionally conducting type, each of said switching means being interposed as a switching element between one of said second conductors and said supervisory device, and control connections for said switching means activated under the control of said detecting means to render the switching means corresponding to said calling line conductive, whereby said supervisory device is caused to respond to the potential change on the second conductor corresponding to said line.

31. In a telephone system, a plurality of lines, each line having a loop circuit including a resistance network, a start conductor connected to said network, the flow of direct current over said loop circuit incident to the closure thereof being effective to set up a calling potential on said conductor, and a rectifier connected to said conductor, a common start means connected to all of said start conductors, connecting means, line identifying means, an array of switching means of the unidirectional current responsive type, each of said switching means being interposed as a switching element between one of said line circuits and said connecting means, control conncetions for said switching means activated under the control of said line identifying means to render the switching means of a given line conductive, whereby the rectifier of said line is effectively connected to said connecting means, a source of A. C. voltage, and means for connecting said source from said connecting means by way of said switching means and said rectifier to said start conductor, said rectifier being poled to set up in said conductor in response to the flow of current through said rectifier, a potential opposing said start potential, whereby said start means is rendered ineffective.

32. In a telephone system the combination as defined in claim 31, and further characterized in that said line identifying means is associated with said common start means and has access to all of said start conductors, said line identifying means being set under the control of the calling potential on the start conductor of a calling line to identify said line and the transmission of said alternating current to said calling line being effective to render said start means ineffective upon the connection of said calling line to said connecting means.

33. In a telephone system the combination as defined in claim 31, and further characterized in that said line identifying means is associated with said connecting means, said line identifying means being set under the control of digital impulses transmitted from a calling line circuit to identify a called line and the transmission of said alternating current to said called line being effective to render said start means ineffective upon the closure of said loop circuit on said called line.

34. In a telephone system the combination as defined in claim 32, and further characterized in that said alternating current is of greater-than-audible frequency, and that in addition to the aforementioned voltage source there is provided, for busy-signaling purposes, a source of A. C. voltage of audible frequency, and means operative in response to a busy condition being encountered by said connecting means for substituting the second-mentioned source for the first-mentioned source, whereby an audible busy signal is transmitted over said calling line and said start means kept in ineffective condition.

35. In a telephone system, a number of line circuits each belonging to two groups respectively corresponding to the two coordinates of a coordinate system and each comprising an individual conductor, first-coordinate and second-coordinate line finder means having access to said individual conductors via a group of first-coordinate and second-coordinate marking conductors respectively, those of said individual conductors which belong to the same first-coordinate group being physically multipled to one end of the corresponding first-coordinate marking conductor and those of said individual conductors which belong to the same second-coordinate group being physically multipled to one end of the corresponding second-coordinate marking conductor, means for changing the potential on one of said individual conductors, thereby to mark the corresponding first-coordinate and second-coordinate marking conductor, asymmetrical conductors interposed in each of said multiple connections to minimize back-feed of potential from one marking conductor into another of the same kind, and control means connected with said finder means and operative in response to the change of potential on said two marking conductors for respectively setting said two finder means on the two positions marked.

36. In a telephone system, a number of line circuits each belonging to two groups respectively corresponding to the two coordinates of a coordinate system and each comprising an individual conductor; a common start conductor; first-coordinate and second-coordinate line finder means having access to said individual conductors via a group of first-coordinate and second-coordinate marking conductors respectively, those of said individual conductors which belong to the same first-coordinate group being multipled to the corresponding first-coordinate marking conductor, those of said individual conductors which belong to the same second-coordinate group being multipled to the corresponding second-coordinate marking conductor and the first-coordinate marking conductor being multipled to said common start conductor; means for changing the potential on one of said individual conductors, thereby to mark the corresponding first-coordinate and second-coordinate marking conductor and activate said common start conductor; rectifier devices interposed in said multiple connections to minimize backfeed of said potential from one marking conductor into another of the same kind; and control means connected with said finder means, said control means being operative in response to the change of potential on said common start conductor for starting said finder means and operative in response to the change of potential on said two marking conductors for respectively setting said two finder means on the two positions marked.

37. In a telephone system, a number of line circuits each belonging to two groups respectively corresponding to the two coordinates of a coordinate system and each comprising an individual conductor; a common conductor; first-coordinate and second-coordinate line-detecting means having access to said individual conductors via a group of first-coordinate and second-coordinate marking conductors respectively, those of said individual conductors which belong to the same first-coordinate group being multipled to the corresponding first-coordinate marking conductor, those of said individual conductors which belong to the same second-coordinate group being multipled to the corresponding second-coordinate marking conductor and the first-coordinate marking conductor being multipled to said common conductor; means responsive to the origination of a call on one of said line circuits to change the potential on the corresponding individual conductor, thereby to mark the corresponding first-coordinate and second-coordinate marking conductor; rectifier devices interposed in each of said multiple connections to minimize back-feed of marking potential from one conductor to another of the same kind; said first-coordinate line-detecting means being operative in response to the change of potential on said first-coordinate marking conductor to determine the first-coordinate group association of said line and exert over said common conductor and said first-coordinate marking conductor potential controls blanking out the second-coordinate marking for all line circuits except those belonging to said one first-coordinate group, and said second-coordinate line detecting means subsequently being operative in response to said change of potential on said second-coordinate marking conductor to determine the second-coordinate group association of said line.

References Cited in the file of this patent

UNITED STATES PATENTS

| | | |
|---|---|---|
| 1,849,694 | Saunders | Mar. 15, 1932 |
| 2,115,320 | Saunders | Apr. 26, 1938 |